United States Patent [19]

Mail et al.

[11] 3,972,816

[45] Aug. 3, 1976

[54] OIL EXTRACTOR

[75] Inventors: Paul Mail, Tulsa; Charles R. Ferrin, Sand Springs; Richard J. Ely, Tulsa, all of Okla.

[73] Assignee: Change, Inc., Tulsa, Okla.

[22] Filed: Aug. 23, 1974

[21] Appl. No.: 500,027

[52] U.S. Cl. .......................... 210/259; 210/73.0 W; 210/80; 210/264; 210/288; 210/295; 210/512 R; 210/DIG. 5
[51] Int. Cl.² .......................................... B01D 17/04
[58] Field of Search .................. 210/23, 73, 80, 84, 210/242, 252, 259, 264, 285, 288, 294, 295, 320, 512, DIG. 5

[56] References Cited
UNITED STATES PATENTS

| | | | |
|---|---|---|---|
| 3,178,024 | 4/1965 | Jacuzzi | 210/264 X |
| 3,381,823 | 5/1968 | Nash | 210/288 X |
| 3,444,077 | 5/1969 | Finch | 210/73 X |
| 3,471,401 | 10/1969 | Huval | 210/23 |
| 3,491,882 | 1/1970 | Elam | 210/73 |
| 3,764,008 | 10/1973 | Darley et al. | 210/73 |
| 3,830,371 | 8/1974 | Garcia | 210/23 X |
| 3,853,753 | 12/1974 | Jones | 210/DIG. 5 |
| 3,878,094 | 4/1975 | Conley et al. | 210/DIG. 5 |

FOREIGN PATENTS OR APPLICATIONS

| | | | |
|---|---|---|---|
| 46-1676 | 8/1966 | Japan | 210/DIG. 5 |

*Primary Examiner*—Charles N. Hart
*Assistant Examiner*—Robert G. Mukai
*Attorney, Agent, or Firm*—Head, Johnson & Chafin

[57] ABSTRACT

Method and means for separating emulsified and entrained oils from water, machine coolants, and substantially any other liquid comprising initially directing a flow stream into an inlet trap for removing relatively large particles from the flow stream, passing the flow stream through a centrifuge for removing substantially all of the entrained solids in the flow stream, moving the flow stream through a de-emulsifier for coalescing of the emulsified oil into droplets sufficiently large for processing in a separator and for filtering any remaining solids from the flow stream, providing a backwash action from the de-emulsifier for recycling of said finally removed solids through the centrifuge, passing the flow stream through a separator for separation of the oil from the other liquid components of the flow stream whereby the separated oil and clean effluent may be removed from the system. The de-emulsifier comprises a chamber containing a bulk dense granular material, preferably water wettable, and the flow stream is directed into the chamber in a downflowing manner through the granular material for mechanically breaking the emulsion into two phases and separating the solids therefrom. The separator comprises a centrally disposed entrance or spreader tube discharging the flow stream radially outwardly through a body of granular media contained within a cylindrical housing concentrically disposed with respect to the entrance tube. The oil and water, or other liquid, are separated during passage of the flow stream through the granular media whereby the oil percolates upwardly through a water reservoir for collection in a collector, and the water or other liquid flows downwardly by gravity for discharge through a suitable valve.

2 Claims, 2 Drawing Figures 3,972,816

OIL EXTRACTOR

BACKGROUND OF THE INVENTION

This invention relates to improvements in oil extractors and more particularly, but not by way of limitation, to an oil extractor wherein a dispersion of oil in water is resolved into two distinct comingled phases by passing the emulsion downwardly through a bed of properly sized granules and the comingled phases are then conveyed to phase separator wherein the phases are dynamically separated and each is discharged separately and independently of the other.

SUMMARY OF THE INVENTION

The present invention comtemplates a novel oil extractor method and means comprising five basic components, each one of which is important in producing clean, oil-free effluent. An inlet basket trap is provided for initially receiving the flow stream, and removes substantially all materials 1/16 inch or larger from the flow stream and protects the supply pump immediately downstream therefrom. A cyclone centrifuge is in communication with the basket trap and receives the fluid therefrom through the supply pump. The centrifuge separates approximately 95% of the entrained solids of a preselected size and larger and deposits the removed solids in an accumulator container. A de-emulsifier is provided downstream from the centrifuge and receives the liquid flow stream therefrom. The de-emulsifier is provided with a bed of suitable granular material, such as quartz, or the like, and the effluent from the centrifuge passes downwardly through the granules whereby any solids passed by the centrifugal separator are removed and the oil and water are resolved into distinct oil and water phases for subsequent separation. The two phase mixture is directed to a separator vessel wherein clean-cut phase separation is effected and each phase is discharged separately therefrom. The separator vessel comprises a cartridge disposed in a water reservoir. The two phase water-oil mixture flows into a centrally disposed spreader tube of the cartridge and is directed radially outwardly therefrom through a body of granular media, preferably similar to those in the de-emulsifier. The granular media is retained within the cartridge by a fine mesh being held in place by suitable expanded metal, or the like. The water and oil are precluded from short-circuiting across the top of the granular media by the simple expedient of providing a layer of packed media above the uppermost outlet ports of the central spreader at least equal to the radial thickness of the media. The agglomerated oil droplets collect on the screen due to low interfacial tension and as they exude from the granular media they form a thickened oil film which migrates upward due to its buoyancy in water. Oil blobs that may be dislodged from this film float upwardly in the water surrounding the cartridge and, along with the oil film, are collected in an oil collection dome for automatic discharge. The clean water, denuded of oil, is withdrawn separately from the separator vessel.

In substantially all industrial process streams there are varying quantities of insoluble debris, such as cigarette butts, pieces of wood, metal chips, clay, silt, graphite, and the like, that will filter out on the granules of the de-emulsifier which are used to resolve the emulsion. After a period of time, this filtered debris may accumulate to such an extent that the resulting increased pressure drop required to maintain flow through the granules will become inordinate and either backwash or replacement of the granules will be required. The backwash may be achieved by temporarily diverting the flow of the effluent into the de-emulsifier for a reverse or upward movement through the bed of granules and back into the centrifuge for recycling. The centrifuge will function for removing the solids from the backwash flow and when the effluent has been sufficiently cleaned from this debris, the normal downward flow of the effluent through the granule bed may be restored.

DESCRIPTION OF THE PREFERRED EMBODIMENT

Figures 1, 2:
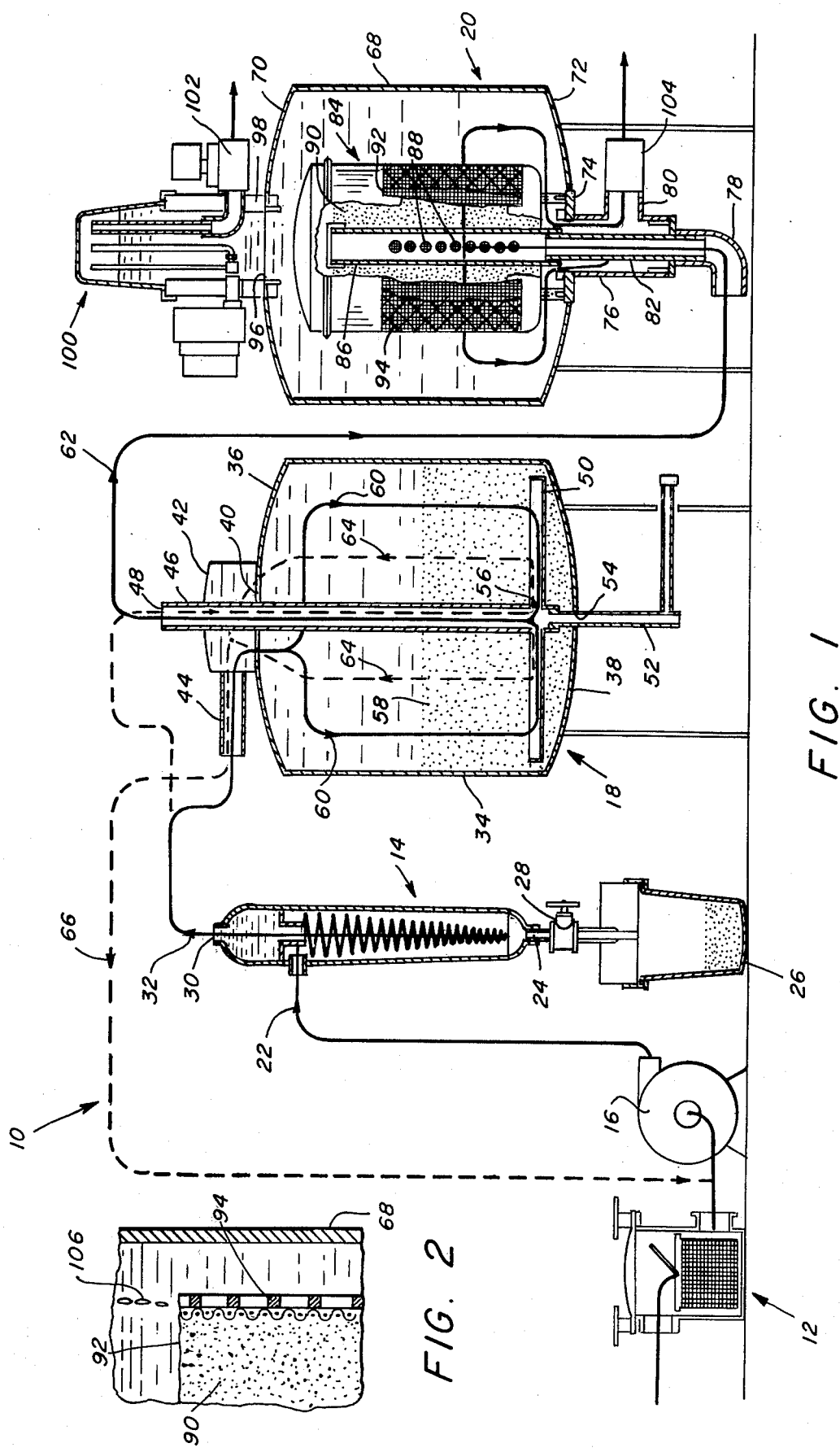
FIG. 1 is a side elevational view of an oil extractor method and means embodying the invention.
FIG. 2 is an enlarged sectional view of a portion of a separator cartridge such as may be used in the invention.

Referring to the drawings in detail, reference character 10 generally indicates an oil emulsion apparatus comprising an inlet trap 12 of any suitable type for initially receiving an effluent or flow stream having emulsified and/or entrained oils therein. The trap 12 is in communication with a centrifuge 14 through a suitable supply pump 16 whereby the flow stream is delivered from the trap 12 to the centrifuge for treatment, as will be hereinafter set forth. The centrifuge 16 in communication with a de-emulsifier 18 for directing the treated effluent thereto, and the de-emulsifier 18, in turn, is in communication with a separator 20 which provides a final separation of the entrained and/or emulsified oil from the other components of the flow stream and independently discharges the components from the system.

The inlet trap 12 may be of any suitable well known type for filtering relatively large solids from the flow stream, as for example all particles 1/16 inch or larger in size. The removed solids may be accumulated in the trap 12 in any well known manner and may be periodically removed, or may be accumulated in a storage container (not shown), as desired. The filtered effluent is delivered to the centrifuge 14 through the supply in the usual manner through suitable conduiting (not shown) or the like and moves in the direction indicated by the arrow 22.

Whereas the centrifuge 14 may be of any suitable type, it is preferable to provide a cyclone centrifuge in order to reduce or substantially eliminate any movable working parts in the overall system or apparatus 10. The overall internal configuration of the usual cyclone contrifuge is generally conical, with the vertex of the cone being disposed at the lower portion of the centrifuge. The effluent is introduced into the upper portion of the cyclone centrifuge 14, usually tangentially, and normally moves downwardly through the apparatus in a whirling or cyclonic action. The solids or heavier particles in the flow stream are thrown radially outwardly against the inner periphery of the centrifuge 14 due to the centrifigual action and fall downwardly therein by gravity. A suitable drain port 24 is usually provided in the lower end of the apparatus 14 for discharge of the solids into a suitable silt pot or accumulation vessel 26. Of course, as the solids accumulate in the vessel 26, as shown at 28, they may be discarded or dumped in any well known manner. In addition, it is usually preferable to interpose a suitable valve 28 between the drain 24 and the pot 26 whereby the solids may be selectively discharged from the centrifuge 14.

The lighter components of the flow stream are directed radially inwardly during the cyclonic action by virtue of the vacuum effect created thereby, and flow upwardly through the apparatus 14 for discharge through a suitable outlet port 30 provided at the upper end thereof. The lighter components of the flow stream then moved into the de-emulsifier 18 through suitable conduiting (not shown) in the direction indicated by the arrow 32. Of course, it may be desireable to interpose a suitable flow meter (not shown) between the centrifuge 14 and the de-emulsifier 18, as is well known.

The de-emulsifier 18 preferably comprises a substantially cylindrical upright or vertically disposed outer housing 34 having the upper and lower ends thereof closed by end plate members 36 and 38, respectively. A centrally disposed opening 40 is provided in the upper closure plate 36 and a suitable inlet housing 42 is secured to the outer surface of the plate 36 in any well known manner, such as by welding, and surrounding the aperture 40. An inlet conduit 44 is in communication with the interior of the inlet housing 42 for directing the flow stream thereto, and the flow stream falls through the opening 40 by gravity into the interior of the outer housing 34. A centrally disposed riser tube member 46 is disposed within the housing 34 and extends longitudinally therethrough whereby the upper end 48 thereof provides an outlet for the de-emulsifier 18. A suitable tray 50 is disposed within the lower portion of the housing 34 and is preferably suitably secured to the outer periphery of the tube 46 for a purpose as will be hereinafter set forth. A conduit 52 is secured to the lower end of the tube 46 and extends through a central aperture 54 provided in the lower end plate 38 of the vessel or housing 34 for providing communication between the interior and exterior thereof for a purpose as will be hereinafter set forth. Of course, suitable valving (not shown) may be provided in the drain conduit 52 for selectively controlling the discharge therethrough. A plurality of circumferentially spaced ports 56 are provided in the tube 46 in open communication with the interior of the tray 50 as clearly shown in the drawing.

A body of suitable granular material 58, such as nearly pure quartz granules of a particularly selected size, is provided in the vessel or housing 34 surrounding the tube 46 and tray 50. The depth of the granule body 58 may be of substantially any desired dimension, but it is preferable that the depth thereof be approximately fourteen inches, but not limited thereto. One particular type granular quartz material which has been found to be satisfactory in this use is a commercial product known as Flint brasive No. 2. The particle distribution of this material is specified by the manufacturers to be as follows:

| U.S. Screen Size | Percent Retained |
|---|---|
| 16 | 0 |
| 20 | 5-15 |
| 30 | 50-60 |
| 35 | 15-25 |
| 40 | 10-20 |
| 50 | 0-10 |

The effluent coming into the de-emulsifier 18 through the conduit 44 and inlet housing 42 falls downwardly by gravity and moves downwardly through the bulk granule body 58 as indicated by the arrows 60 and the solid flow line inscribed therein. As the effluent reaches the tray 50, it moves radially inwardly and passes upwardly through the tube 46 as shown by the solid line therein and in the direction indicated by the arrow 62. The granule bed or body 58 removes any solids from the effluent which may have passed through the centrifuge 14, and resolves the oil-water emulsion into distinct oil and water phases for subsequent separation.

When and if the solids load on the granular media 58 becomes sufficiently great as to increase the pressure drop across the bed 58 to an intolerable lever, the filter or bed 58 may be backwashed by diverting water from the centrifugal separator 14 to the bottom of the bed 58 by connecting the outlet 30 of the centrifuge 14 with the conduit 52 of the de-emulsifier. Also, the inlet conduit 44 is provided with communication to the upstream side of the supply pump 16 as shown in dashed lines in the drawing. During a backwash operation, the effluent will enter the housing 34 through the conduit 52 and be forced upwardly through the granule bed 58 as shown by the dashing lines and in the direction indicated by the arrows 64. The backwash flow will move out of the vessel 34 through the conduit 44 in the direction indicated by the arrow 66 and will be admitted into the incoming flow stream upstream of the pump 16 as clearly shown in the drawing. Alternately, the backwash flow stream may be dumped into a settling pond or vessel, if desired.

The two phase mixture (oil and water) is conveyed or directed from the de-emulsifier 18 to the separator 20 through the outlet 48 and in the direction indicated by the arrow 62 as hereinbefore set forth. The separator 20 as shown herein preferably comprises an outer housing 68, preferably of a substantially upright cylindrical configuration, but not limited thereto, having the opposite ends thereof closed by suitable end plates 70 and 72. The lower end plate 72 is provided with a central aperture 74 having a suitable sleeve or T-fitting 76 secured therein in any suitable manner (not shown). An elbow fitting 78, or the like, is suitably securely to the sleeve 76 oppositely disposed from the opening 74 and in substantial axial alignment therewith for receiving the effluent from the de-emulsifier 18 therethrough. A perpendicularly disposed outlet 80 is provided for the sleeve 76 for a purpose as will be hereinafter set forth. A centrally disposed tube 82 is suitably secured within the sleeve 76 and extends longitudinally therethrough from the elbow 78 to a point within the interior of the vessel 68 as clearly shown in the drawing. The tube 82 directs the two phase mixture into the interior of a cartridge generally indicated at 84 which is centrally disposed within the vessel 68.

The cartridge 84 comprises a central tube 86 adapted to be suitably secured on the open upper end of the tube 82 for receiving the two phase mixture therefrom. The tube 86 is provided with a plurality of longitudinally and circumferentially spaced bores or apertures 88 which direct the effluent radially outwardly from the tube 86. A granular body 90 is around the tube 86 and is contained with a suitable cylindrical fine mesh screen 92 which, in turn, is maintained in position by an outer cylindrical housing 94 constructed of a suitable expanded metal screen material. The fine mesh screen 92 is preferably constructed from a suitable polypropylene screening material, and the granular body 90 is preferably a bed of quartz granular material substantially identical to that hereinbefore set forth. In order to preclude the water and oil from short-circuiting across the top of the media 90, the thickness of the layer of media above the uppermost apertures 88 should be at least equal to the radial dimension of the media 90. The pressure drop to the top of the media 90, across the top thereof, and back down will be greater than that along the radii, and thus no excessive amount of fluid will follow this route.

The upper end 70 of the vessel 68 is provided with a central opening 96 for receiving a suitable fitting 98 therein normally provided on a suitable collector 100. The collector 100 is usually provided with a suitable discharge outlet 102 for for discharging the contents therefrom as is well known. Whereas the collector 100 may be of any suitable type, it is preferable that it be of a level control capacitance type having an electrical oil dump valve for dishcarge of the contents thereof. The discharge conduit 80 at the lower end of the vessel 68 is preferably provided with a suitable backpressure valve 104 for discharging liquid therefrom as is well known.

The effluent enters the separator 20 through the fitting 78 and flows upwardly through the center tube or spreader 82, from when it is discharged through the ports 88. The main portions of the effluent move substantially radially outwardly through the granule bed 90, which separates oil phase from the water phase. It is preferable that the radial thickness of the media 90 be at least 4 inches, but not limited thereto. The agglomerated oil droplets collect on the screen 92 due to the low interfacial tension as they exude from the granular media and form a thickened oil film which migrates upwardly due to its buoyancy in water. Oil blobs that may be dislodged from this film float upwardly in the water, as shown at 106 in FIG. 2 and, along with the oil fill, are collected in the oil collection dome 100 for automatic discharge therefrom in the usual manner. The clean water, which has been denuded of oil, is withdrawn from the bottom of the vessel 68 through the outlet 80 and valve 104 in the well known manner. In the event traces of certain dispirsants are present in the water or effluent to be treated, certain chemical aids, such as cationic polymers may be injected into the effluent in order to facilitate maximum resolution of the emulsion.

From the foregoing it will be apparent that the present invention provides a novel method and means for extraction or separating entrained or emulsified oils from flow streams. The novel method comprises initially directing the effluent through an inlet trap for removing substantially all of the relatively large solids present in the flow stream. The filtered effluent is then directed through a centrifuge wherein approximately 95% of the remaining solids above a specified size are removed therefrom. The lighter components of the flow stream move from the centrifuge into a de-emulsifier wherein the stream flows downwardly by gravity through a granule bed which removes any additional solids from the flow stream and separates the effluent into a two phase oil-water mixture. The two phase mixture is then directed through a separator wherein the mixture passes substantially radially outwardly through a second granule bed where the oil phase is separated from the water phase. The oil phase rises to the top of the water due to the bouyancy of the oil in water, and is directed to an oil collector for removal from the system. The de-nuded water is removed independently from the separator. A backwash feature is provided in the de-emulsifier whereby accumulated solids may be washed away from the top of the granule bed and either removed from the system, or recycled through the centrifuge for treatment through the system. It is to be particularly noted that substantially no moving parts are present in the system, which greatly reduces maintenance problems and prolongs the useful life of the apparatus. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. An apparatus for extracting solids and oil from an effluent and comprising filter trap means for initially receiving the effluent therethrough, centrifuge means in communication with the filter trap for receiving the filtered effluent therefrom and separating the effluent into lighter and heavier components, de-emulsifier means in communication with the centrifuge means for receiving the lighter components therefrom, said de-emulsifier being provided with a granular bed for filtering the effluent and to create a mixture having two distinctive phases, said de-emulsifier means including a housing to receive said effluent means to pass said effluent downwardly through said granular bed, horizontal tray means provided in said housing upon which said granular bed rests, vertical and central riser tube means through said granular bed and housing which is in open communication with said tray means to dishcarge said two phase mixture, and backwash means to clear said granular bed, separator means in communication with the de-emulsifier means for receiving the two phase mixture therefrom, removable granular filled cartridge means provided in said separator means for receiving the two phase mixture therein, means provided in said cartridge means for flowing said mixture radially outward therethrough thereby separating the two phases of the mixture, and means for independent discharge of the two separated phases from the separator.

2. In an apparatus for extracing oil from an effluent, de-emulsifier means as set forth in claim 1 wherein the granular bed comprises a body of water wettable granules of preselected sizes.

* * * * *